United States Patent [19]

Baxter et al.

[11] Patent Number: 4,809,270
[45] Date of Patent: Feb. 28, 1989

[54] VARIABLE TIME SLOT COMMUNICATION SYSTEM

[75] Inventors: Leslie A. Baxter, Eatontown; Paul R. Berkowitz, Red Bank, both of N.J.

[73] Assignee: AT&T Information Systems Inc., American Telephone and Telegraph Company, Murray Hill, N.J.

[21] Appl. No.: 150,489

[22] Filed: Feb. 11, 1988

Related U.S. Application Data

[63] Continuation of Ser. No. 685,247, Dec. 21, 1984, abandoned.

[51] Int. Cl.⁴ .............................................. H04J 3/16
[52] U.S. Cl. ..................................................... 370/95
[58] Field of Search ................ 370/58, 67, 68, 85, 370/89, 95, 104, 29, 24

[56] References Cited

U.S. PATENT DOCUMENTS

| | | | |
|---|---|---|---|
| 3,959,594 | 5/1976 | Srivastava | 370/67 |
| 3,982,074 | 9/1976 | Clark | 370/95 |
| 4,251,880 | 2/1981 | Baugh et al. | 370/80 |
| 4,322,845 | 3/1982 | Fennel, Jr. et al. | 370/95 |
| 4,366,566 | 12/1982 | Cochennec | 370/67 |
| 4,389,720 | 6/1983 | Baxter et al. | 370/62 |
| 4,488,293 | 12/1984 | Haussmann et al. | 370/84 |

Primary Examiner—Douglas W. Olms
Assistant Examiner—Wellington Chin
Attorney, Agent, or Firm—David R. Padnes; David H. Tannenbaum

[57] ABSTRACT

A time division communication system having peripheral devices controlled from a port circuit is arranged such that the port circuit may have assigned to it a variable number of time slots for any peripheral device associated therewith. Each port circuit has a microprocessor control device which is capable of controlling communication to or from the port circuit over the system time division bus or to and from the port circuit and the peripheral over a variable number of time slots, none of which are preassigned to the port circuit.

14 Claims, 4 Drawing Sheets

VARIABLE TIME SLOT COMMUNICATION SYSTEM

This application is a continuation of application Ser. No. 685,247, filed Dec. 21, 1984, now abandoned.

BACKGROUND OF THE INVENTION

This invention relates to a time division communication system having modular, plug-in peripheral port circuit packs that serve as communication interfaces to a variety of peripheral devices and more particularly to such a system in which each port circuit pack may have a variable number of time slots assigned thereto for any given period of time.

Traditional time division communication systems utilizing plug-in port circuit packs have time slots assigned to each plug-in slot and therefore to each installed port circuit pack on a permanent basis such that, for example, communications to or from a certain peripheral device can occur only during the preassigned time slots. This arrangement has the inherent limitation that a port circuit pack may not simultaneously serve more peripheral devices than the number of preassigned time slots would allow. Such a traditional system would require the permanent assignment to the port circuit of the maximum number of time slots usable by the peripheral devices even if some or all of the peripheral devices were idle.

To the extent that the total number of time slots in a practical communication system is finite and affects the economic cost of the system, such a traditional system would be, in this way, limited in the number of peripheral devices it could serve. Moreover, each modular plug-in port circuit pack would be constrained by the number of preassigned time slots in the number of peripheral devices it individually could serve.

Since different types of peripheral devices require different amounts of port circuitry, it is natural to be able to serve more of certain types than others from a corresponding type port circuit pack. If it is desired to be able to flexibly equip plug-in slots with port circuit pack types of varying densities, the number of preassigned time slots must correspond to the densest circuit types. The less dense types would then carry a penalty of inefficient time slot usage with a corresponding penalty in system capacity and economy. Using such an arrangement, it also would be impossible to take advantage of technological advances that might permit increased circuit density and therefore more peripheral devices per port circuit pack.

Similarly, technological advances may create the opportunity for new peripheral devices that require an increased number of time slots per device as compared with earlier devices. A traditional system might not be able to serve such new devices from a single port circuit pack if the number of required time slots exceeded the number preassigned to each port circuit pack.

SUMMARY OF THE INVENTION

These and other problems have been solved by our arrangement of a time division communication system having modular plug-in port circuit packs that may have assigned to them a variable number of time slots. This invention allows for efficient utilization of the system time slot capacity while it imposes no artificial limits on system peripheral device capacity and permits each plug-in slot to accept a variety of port circuit pack types where the number of peripheral devices served by a port circuit pack and the number of time slots usable by the peripheral device would, in general, depend on the port circuit type. Furthermore, the number of time slots used by a peripheral device at a given instant would, in general, depend on the connection status of the peripheral device and could vary from none to the maximum number usable by the device.

DETAILED DESCRIPTION

Figure 1:
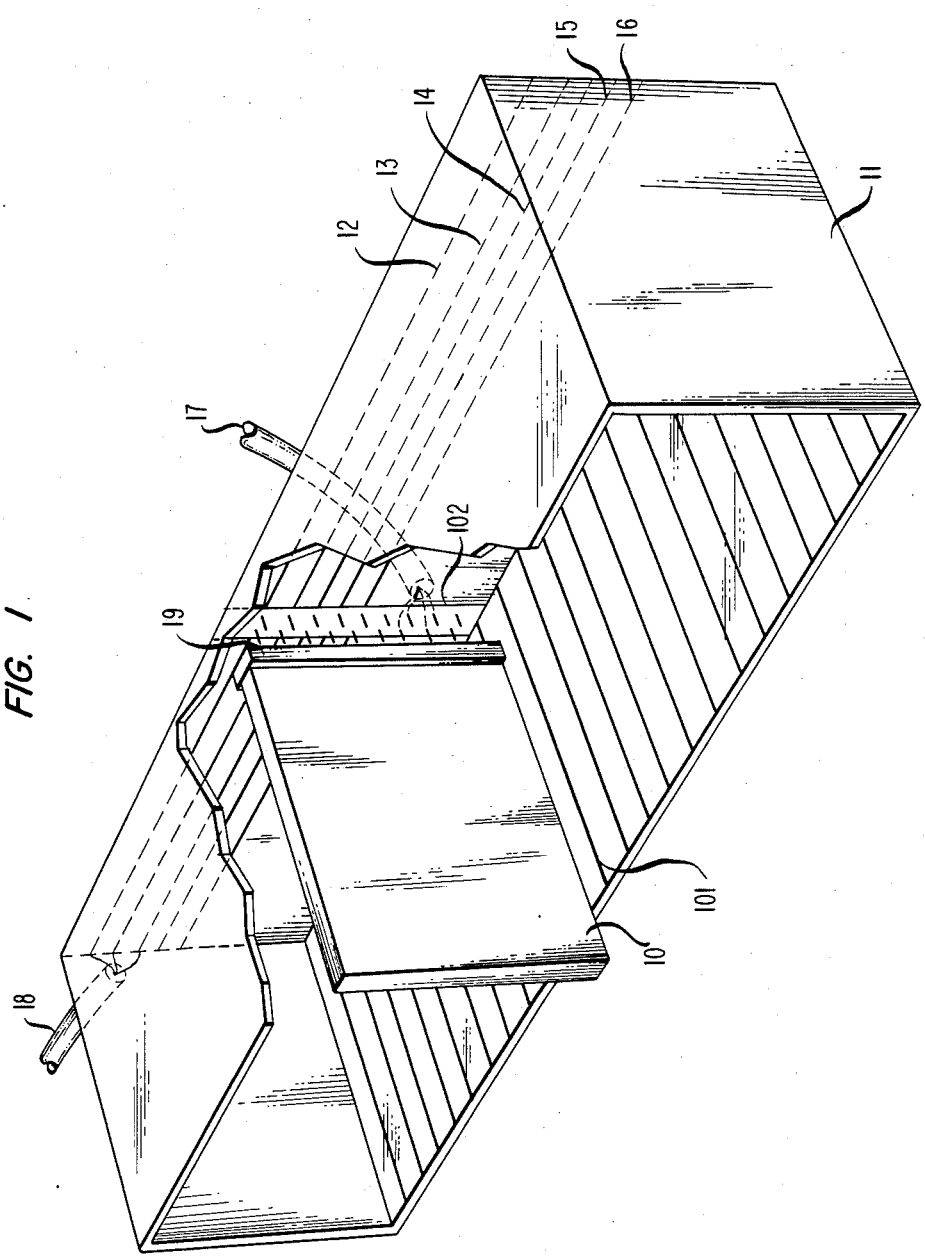
FIG. 1 illustrates the physical structure of a time division multiplex communication system having modular plug-in peripheral port circuit packs.
Figure 2:
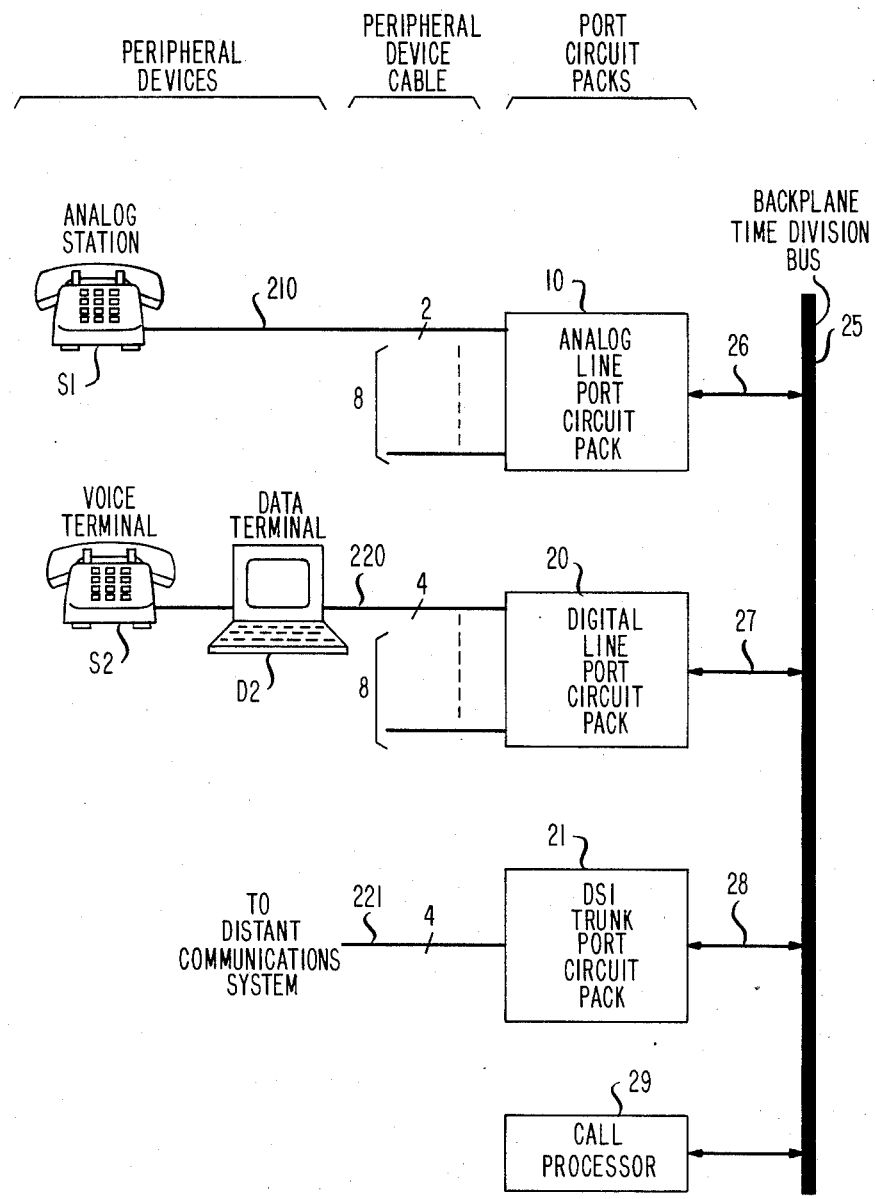
FIG. 2 shows a block diagram of a time division multiplex communication system in which the time slot access circuitry is distributed among the system port circuit packs.

FIG. 1 illustrates the physical structure of a time division communication system having modular plug-in peripheral port circuit packs 10 that serve as communication interfaces to system peripheral devices shown in FIG. 2 as S1, S2 and D1. A port circuit pack shelf 11 (FIG. 1) is comprised of a rectangular prismatic frame, a backplane with printed wiring busses 12 through 16 and plug-in slots defined by circuit pack guides 101 and a backplane connector 102. Modular plug-in port circuit pack 10 containing port circuit components and interconnections slides between the guides and is equipped with a circuit pack connector 19 which mates mechanically and electrically with a corresponding backplane connector 102 to connect wiring on the port circuit pack to backplane wiring busses 12–16 and to a peripheral device cable 17. The wiring busses may be interconnected with other shelves through an inter-shelf wiring harness 18.

Peripheral device cable 17 connects to peripheral devices served by the port circuit pack. Port circuit packs are available in a variety of types to serve a variety of peripheral device types. Plug-in slots are universal in that all port circuit pack types are electrically and physically compatible with guides, connectors and wiring busses and the peripheral device cable, with, for example, 48 wires, is identical for all peripheral device types.

FIG. 2 shows a block diagram of a time division communication system in which the time slot access circuitry is distributed among the system port circuit packs 10, 20 and 21 and in which the three circuit pack types are shown each having a different maximum number of usable time slots.

In this distributed architecture a port circuit pack for an active peripheral device is assigned by call processor 29 with one or more time slots in which to place its transmit samples during each sample frame. The circuit pack may also be instructed to receive the samples from a variable number of time slots. Circuitry in the port circuit pack may be used to add several receive samples together to form conference sums when a peripheral device is connected to a conference cell. This operation is described in U.S. Pat. No. 4,389,720, issued June 21, 1983, which patent is hereby incorporated by reference herein. For the purposes of this discussion, a time slot in the system is considered to be "used up" by the peripheral device and port circuit pack that furnished the transmit sample. There is no limit to the number of port cirtcuit packs and peripheral devices that may receive the sample in a given time slot and therefore we do not count the number of received time slots as a finite resource. For example, a two-way call uses two time slots: each peripheral device contributes one transmit time slot and receives one. A three-way call uses three time slots: one for each of the transmit samples. Though each of the three conferees receives two samples, one from each of the other two conferees, these have already been accounted for.

Analog line circuit pack 10 serves eight standard analog type single line station sets such as set S1 via cable 210. Analog-to-digital conversion circuitry (codecs) in the port circuit pack convert the station's transmitted voice signal to a digital format which can then be assigned to one time slot on the time division bus 25. The total of eight stations served by an analog line port circuit pack requires a maximum of eight transmit time slots. Also note that each station sets uses one pair of 24 pair peripheral device cable 210.

Digital line port circuit pack 20 serves eight digital work stations consisting of a digital voice terminal S2 and a digital data terminal D2. In this example there are a maximum of 16 time slots required by the eight work stations. Since each workstation requires both a transmit and a receive cable pair, a total of 16 pairs of the peripheral device cable 220 are used.

DS1 trunk port circuit pack 21 serves a single 2-pair communications circuit 221 providing 24 voice and data channels to a distant communications system and can require up to 24 time slots when fully active.

In each of these three examples the number of time slots used by a port circuit pack is variable as a function of the port circuit pack type, and the number of installed peripheral devices and the network connection status of the peripheral devices. Given the low duty cycles of many peripheral devices, a backplane time division bus with, for example, 512 time slots, may support well over 512 peripheral devices even if a given device may require multiple time slots when fully active. Furthermore, a given plug-in slot may be flexibly allocated to different port circuit pack types even though a wide range of time slot needs may exist between types without wasting any of the 512 time slots.

Figure 3:
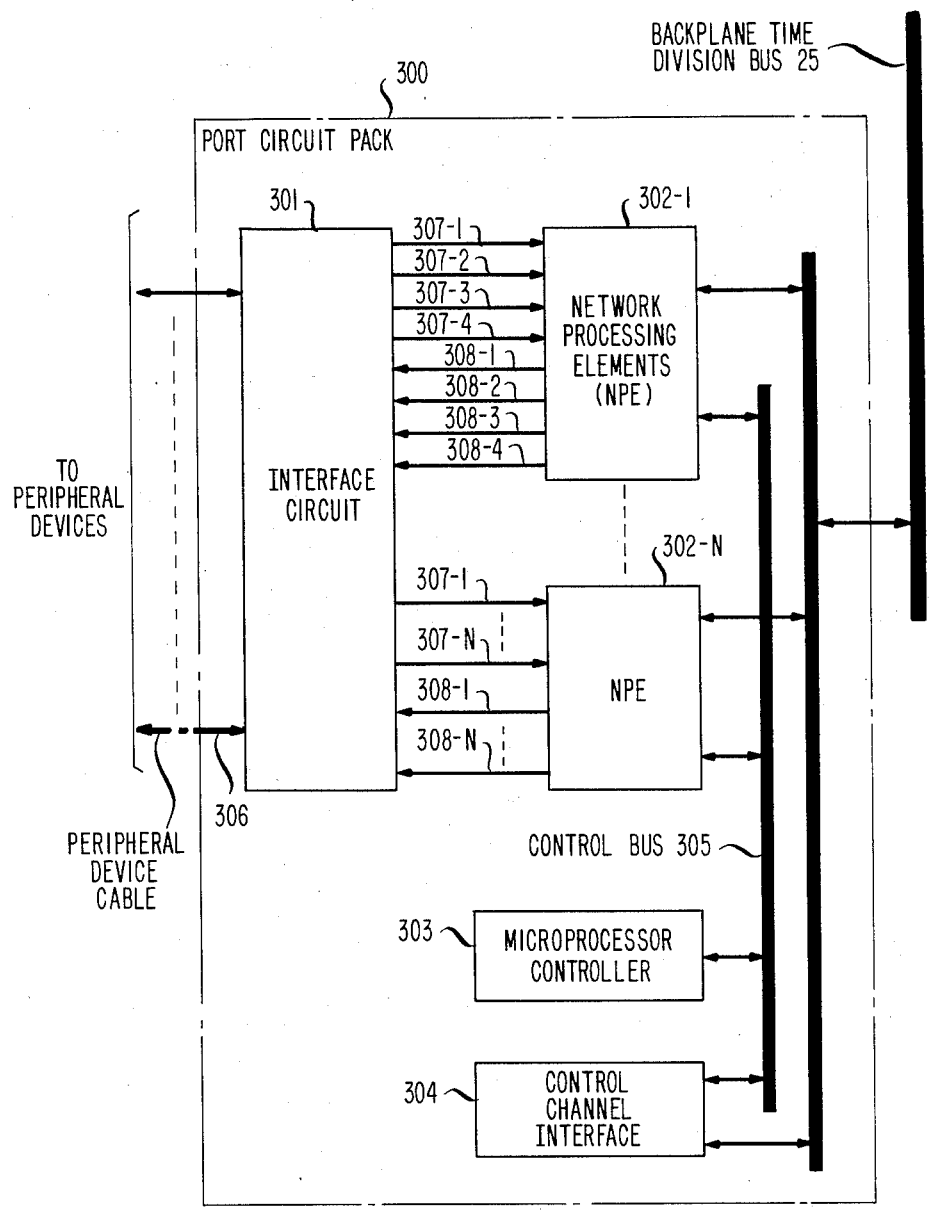
FIG. 3 illustrates the architectural elements of a port circuit pack.

FIG. 3 illustrates the architectural elements of a port circuit pack 300 for the time division communications system shown in FIG. 2.

A peripheral device cable 306 connects one or more devices to appropriate interface circuitry 301 on the port circuit pack. This interface circuit 301 provides the electrical signals required for transmission and signaling between the communications system and the peripheral devices. For analog peripheral devices the interface circuit would perform analog to digital conversion. For digital peripheral devices the interface circuit might perform certain formatting functions. In any case, the interface circuit provides a plurality of 64 kilobit per second data bit streams 307-1,N from it to a group of network processing elements, NPE's 302-1,N. A plurality of 64 Kbs bit streams 308-1,N also go from the NPE's to the interface circuit. Each bit stream to an NPE represents a stream of transmit samples from a peripheral device that may be allocated a system time slot on backplane time division bus 25. Each bit stream to the interface circuit represents a stream of receive samples to a peripheral device that may be formed from a plurality of time slots on backplane time division bus 25.

The NPE can serve up to 4 bit streams in each direction between it and the interface circuit. Normally, a pair of bit streams, one in each direction, are associated with a single bidirectional communication channel to a peripheral device and it is convenient to view the NPE as a 4 channel device.

The NPE serves as the mechanism that connects backplane time division bus time slots with the samples to and from the interface circuit and ultimately the peripheral devices. Microprocessor controller 303 assigns transmit and receive time slots to each of the NPE's over control bus 305. Control channel interface 304 allows microprocessor 303 to communicate with call processor 29 (FIG. 2) over bus 25. When a network connection is to be established in the system, call processor 29 (FIG. 2) computes which time slots are to be used for the call and sends this information to the microprocessor controller(s) 303 (FIG. 3) of the ports involved. The microprocessor controller(s) then program(s) the NPE's to transmit and receive on specified time slots for the duration of the call.

Figure 4:
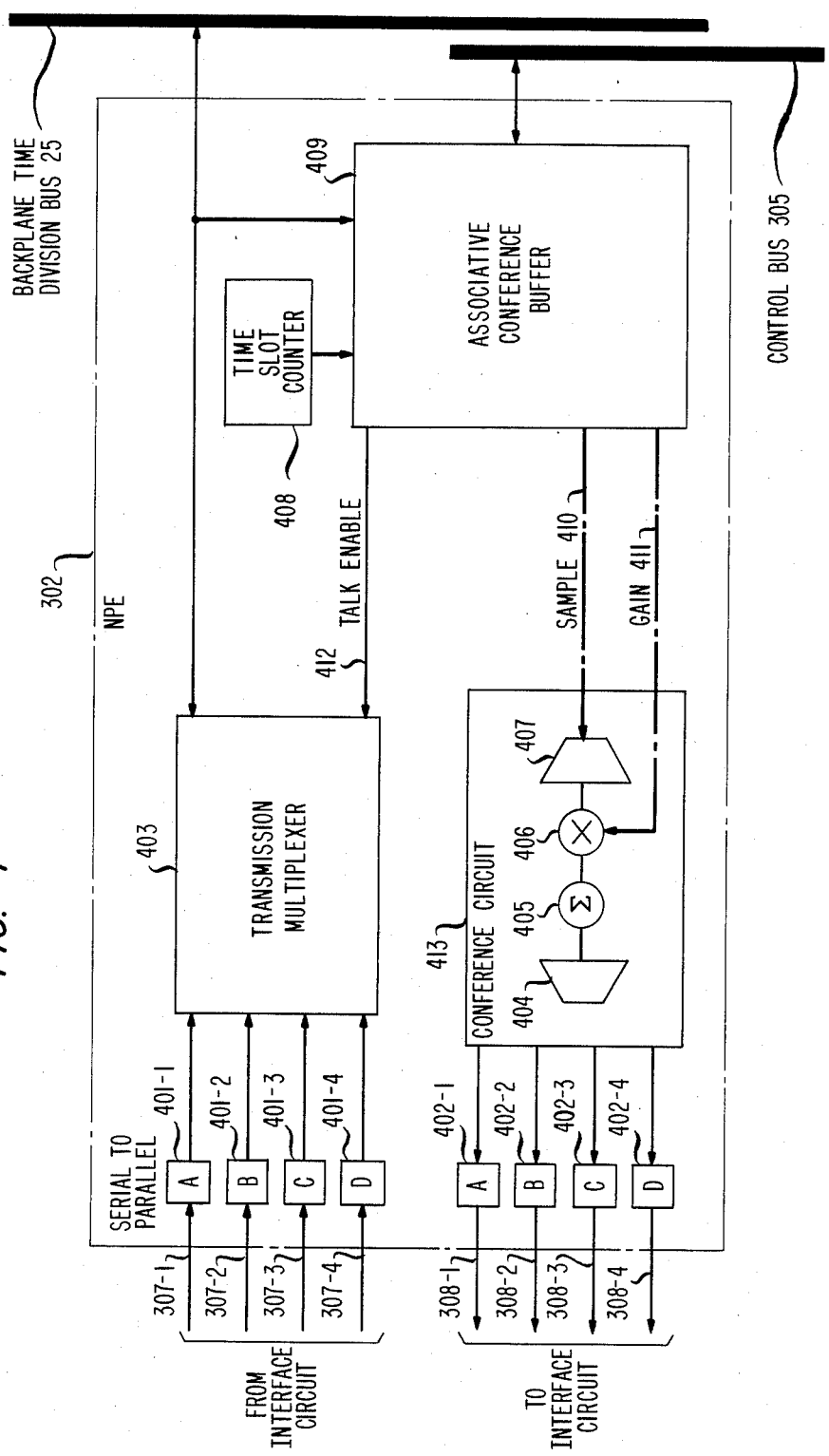
FIG. 4 shows the internal structure of the network processing element.

FIG. 4 shows the internal structure of the NPE. Associative conference buffer 409 is used both as a control store that can be written and ready by microprocessor controller 303 (FIG. 3) over control bus 305 and as a buffer for time slot samples from time division bus 25. Memory locations are loaded by microprocessor controller 303 with time slot numbers for specifying a talking and up to seven listening time slots. Companion memory locations are loaded with gain values to be applied to samples received from the time division bus. A talk enable bit can also be stored for a talking time slot.

The locations holding the time slot number also act as a content addressable memory by comparing their content against time slot counter 408 and controlling a sample transfer on the specified time slot. A sample transfer may consist of activating talk enable 412 lead to transmission multiplexer 403 to place a sample onto the time division bus or it may involve storing a sample from the time division bus 25 in a sample buffer location.

The sample buffer contents along with corresponding gains values are transmitted to conference circuit 413. The sample, which may be μ-law or A-law compressed PCM, is first expanded to linear PCM by expander 407 and then scaled by the gain value in multiplier 406 and accumulated into a conference sum by accumulator 405. Compressor 404 reconverts the conference sum to compressed format.

Serial-to-parallel converters 401-1,4 and 402-1,4 convert samples from/to the serial format used by interface circuit 301 (FIG. 3) and to the parallel format used internally in the NPE and on time division bus 25.

CONCLUSION

While our invention is shown utilized in a particular communication system, it is understood that the principles and concepts taught herein will apply to many systems, some serving conventional telephones and some serving data terminals which interface with other data terminals or with computers. The variable time slot communication system allows for vastly increased flexibility over existing systems, especially when it comes to system or station rearrangements.

What is claimed is:

1. A communication system having a plurality of port circuits, each such port circuit controlling communications to and from at least one communication device, said system comprising
a time division network common to all of said port circuits for moving bytes of data between any of said port circuits, and
means for dynamically assigning to any of said port circuits a plurality of time slots in at least one frame for the interchange of data bytes between any of said port circuits, the assigned plurality of time slots for one of said plurality of port circuits and for at least one other one of said plurality of port circuits being identical in that data bytes transmitted in assigned time slots from said one of said plurality of port circuits are simultaneously received in the assigned time slots in which they were transmitted by said at least one other one of said plurality of port circuits.

2. The invention set forth in claim 1 wherein a plurality of said port circuits are resident on a single plug-in circuit pack and wherein said system contains a plurality of said circuit packs and wherein each said circuit pack includes said assigning means for assigning time slots for all said port circuits resident on said circuit pack.

3. The invention set forth in claim 2 wherein said communicating devices communicate over one or more communication channels and wherein the number of said channels associated with each said circuit pack is dependent upon the type of communication devices associated therewith.

4. The invention set forth in claim 3 wherein the number of time slots associated at any one time with one of said circuit packs is variable independent of the number of port circuits on said circuit pack.

5. The invention set forth in claim 4 wherein said number of time slots associated with one of said circuit packs at a particular time is zero.

6. The invention set forth in claim 4 wherein said system is arranged having a physical support carrier for supporting circuit packs in physical slots constructed within said carrier, said physical circuit pack slots are each arranged to accept a plurality of said circuit packs one at a time, each said circuit pack having different numbers of said channels.

7. A port circuit for connection to a time division network where bytes of data are transported in time slots established on said network, said port circuit comprising
means for transferring said bytes of data between at least one communication device associated with said port circuit and said time division network, and
means for controlling said transfer of said data bytes with respect to said network by dynamically assigning data bytes transferred to said network to a plurality of time slots in at least one frame, said plurality of time slots assigned to said port circuit and to at least one other port circuit connected to said network being identical in that data bytes transferred to said network from said port circuit in said assigned plurality of time slots are simultaneously transferred in this assigned plurality of time slots from said network to said at least one other port circuit.

8. The invention set forth in claim 7 wherein a plurality of said port circuits are resident on a single plug-in circuit pack and wherein said system contains a plurality of said circuit packs and wherein each said circuit pack includes assigning means for assigning said time slots for all said port circuits resident on said circuit pack.

9. The invention set forth in claim 8 wherein said communicating devices communicate over one or more communication channels and wherein the number of said channels associated with each said circuit pack is dependent upon the type of communication devices associated therewith.

10. The invention set forth in claim 9 wherein the number of time slots associated at any one time with one of said circuit packs is variable.

11. The invention set forth in claim 10 wherein said number of time slots associated with one of said circuit packs at a particular time is zero.

12. The invention set forth in claim 10 wherein said system is arranged having a physical support carrier for supporting circuit packs in physical slots constructed within said carrier, said physical circuit pack slots are each arranged to accept a plurality of said circuit packs one at a time, each said circuit pack having different numbers of said channels.

13. A communication system having a modular growth architecture wherein plug-in circuit pack modules are used for interfacing a plurality of communication channels with a time division multiplexed bus wherein data bytes are carried in time slots, said bus common to all of said communication channels, wherein said circuit packs each include means for dynamically associating any of said channels at any given time with a plurality of time slots in at least one frame, said plurality of time slots associated with a first and a second one of said communication channels being identical so that information transferred from said first one of said plurality of communication channels to said bus is simultaneously transferred from said bus to said second one of said plurality of communication channels.

14. The invention set forth in claim 13 wherein said associating means includes means for receiving time slot assignment information over said time division bus.

* * * * *